United States Patent Office 2,873,026
Patented Feb. 10, 1959

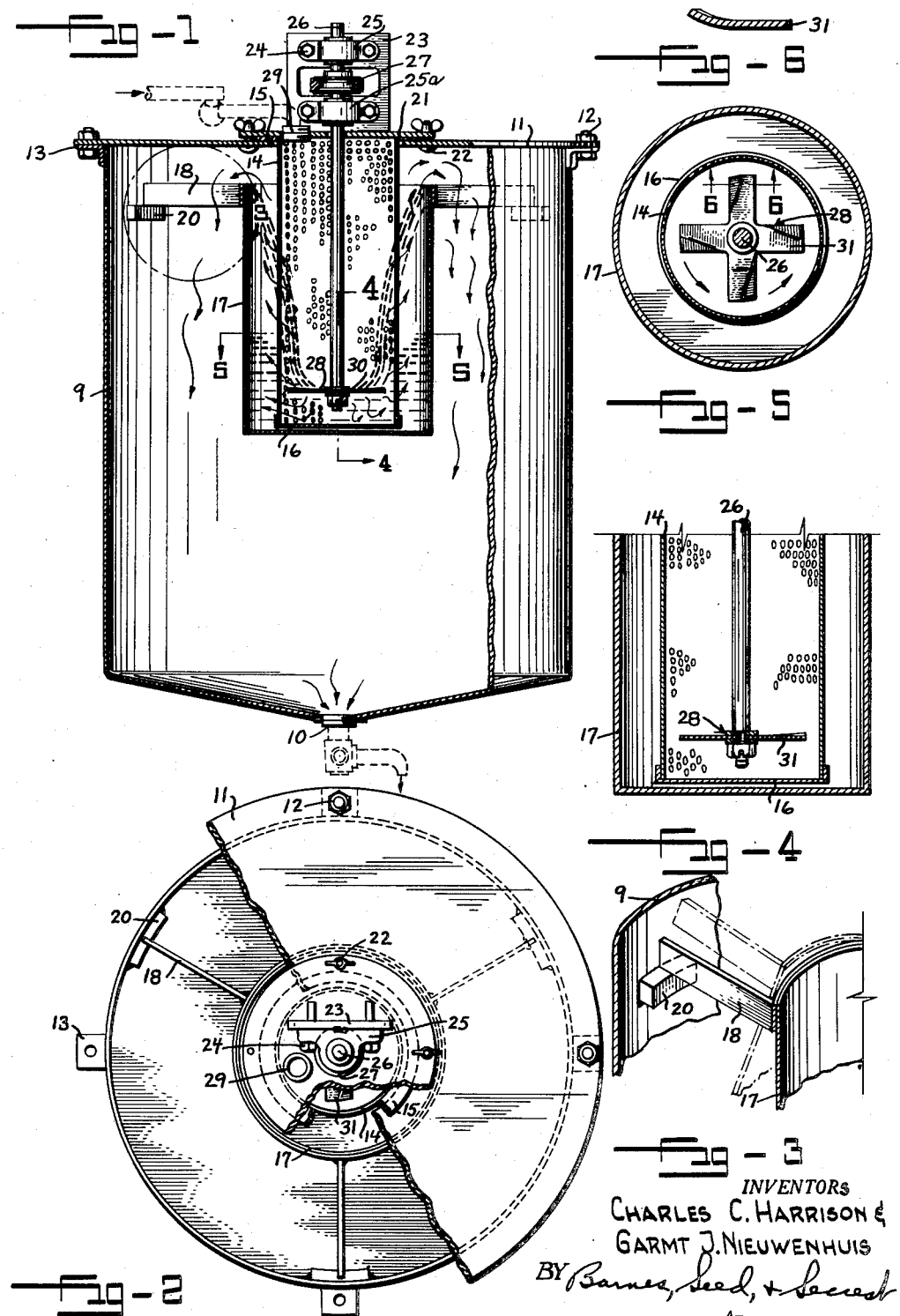

2,873,026

METHOD AND APPARATUS FOR PREPARING AND FILTERING ANIMAL BLOOD FOR DRYING

Garmt J. Nieuwenhuis and Charles C. Harrison, Seattle, Wash.

Application August 29, 1955, Serial No. 531,085

11 Claims. (Cl. 210—67)

The present invention relates to a method and apparatus for preparing and filtering animal blood for drying.

It is well known that the success of a blood-drying operation is very much dependent upon the manner in which the blood is handled between the time it leaves the killing floor and the introduction of the blood into the drying apparatus, and particularly how well it is filtered to remove hair and other foreign matter present. The coagulating characteristic of blood and its tendency to form stringy fibrins if agitated before coagulation make filtering of blood preparatory to drying a complex problem. The blood should be free of clots and fibrins during the drying operation and yet these are likely to form at any time after uncoagulated blood is filtered. Therefore, even if the filtering can be accomplished almost immediately after the blood is drawn, the filtered blood may be unsuitable for drying by the time it is subjected to heat in the drying operation, and in fact, may not only be unsuitable for drying, but may clog and otherwise foul piping and other apparatus.

Accordingly, our invention aims to provide a method and apparatus which will effectively filter blood and assure that delay or agitation thereafter will not cause coagulation or a formation of fibrins.

As a more particular object our invention aims to provide a filtering device which will isolate blood clots of a given size without clogging the filter and will dice these clots until they are divided into particles fine enough to pass through the filter.

With yet additional objects and advantages in view which, with the foregoing, will appear and be understood in the course of the following description and claims, the invention consists in the new method and in the apparatus for preforming said method, and in the adaptation and combination of parts hereinafter described and claimed.

In the accompanying drawings:

Figure 1 is a longitudinal vertical sectional view through our filtering apparatus with the parts thereof shown in elevation.

Fig. 2 is a top plan view of the apparatus with parts broken away.

Fig. 3 is an enlarged perspective view of the portion indicated by the detail line 3 of Fig. 1.

Fig. 4 is a fragmentary enlarged vertical sectional view taken as indicated by line 4—4 of Fig. 1.

Fig. 5 is an enlarged horizontal sectional view taken as indicated by line 5—5 of Fig. 1; and Fig. 6 is a transverse sectional view of one of the impeller blades taken as indicated by line 6—6 of Fig. 5.

Once blood has coagulated fibrins cannot be formed. We take this fact into account in our method in that as the first step in handling the blood after it leaves the killing floor we batch store it in tanks long enough to completely coagulate. The coagulated blood batch is then transferred to a supply tank and the congealed mass of blood clots is thoroughly mixed with the liquid portion of the blood by stirring. This mixed coagulated blood is then fed into our filtering unit, to be hereafter explained, which not only isolates hair and other foreign matter, but also dices the blood clots into particles fine enough to pass through the filter screen. The filtered product is then ready for drying.

Referring to the drawings it is seen that our filtering unit may be mounted in a collection tank 9 having an outlet 10 and a cover plate 11. The latter is held by bolts 12 to ears 13 projecting from the rim of the tank and has a circular central opening through which is inserted a cylindrical screen 14. This screen is soldered at the top to a ring 15 resting on the cover plate 11 and has its lower end closed by a cap 16 interfitting with the screen. We have found that a perforated metal screen having a 0.028 hole diameter gives excellent performance but other screen materials and hole sizes will give satisfactory results. The cap 16 may be solid or formed of screen material. Surrounding the screen 14 in spaced relation thereto is a baffle tank 17 which is open at the top. Support arms 18 radiate from the upper portion of the baffle tank and rest by their outer ends on lugs 20 welded to the inner wall of the collection tank 10.

The central opening in the cover plate 11 is closed by a circular lid 21 which bears against the ring 15 and extends radially therebeyond to receiving anchoring bolts 22. These are provided with wing nuts for ready removal of the lid to gain access to the screen. The lid is provided with an inlet fitting 29 and has mounted thereon an upstanding bracket 23. To the latter, bolts 24 secure a pair of ball bearing units 25, 25a having their journals aligned with the longitudinal axis of the screen 14. A shaft 26 projecting downwardly through the lid 21 is journaled in these bearings and carries a drive pulley 27 therebetween. At its lower end the shaft 26 is necked and threaded to receive a combination agitating and dicing impeller 28 and a nut 30 for locking the impeller on the shaft.

The impeller 28 may be four-bladed as shown and the lead edge of each blade 31 is desirably bent up about five degrees as best shown in Fig. 6 to better agitate the blood as the impeller is rotated.

A commercially operating pilot model of our filtering unit has an eight inch diameter screen with 0.028 inch filter openings therethrough, a baffle tank sixteen inches high and twelve inches in diameter, and an eighteen gauge impeller six inches across with its blades one inch wide and driven at 4,200 R. P. M. No limitation in dimensions or impeller speed is intended by this example.

In the operation of our filtering apparatus the coagulated blood to be filtered is fed from the supply tank through the inlet 29 into the screen unit. As the depth of blood builds up the impeller forms a vortex and also dices the blood clots so that the clots are dissected into fine enough particles to pass through the filter openings in the screen. A prime purpose of the vortex, outlined roughly in Fig. 1, is to help prevent clogging of the screen by keeping the clots and other suspended matter larger than the screen openings in motion relative to the screen. Blood filtering through the screen is confined within the baffle tank until action of the vortex spills it over the top of the baffle tank 17 into the collector tank 9. The purpose of the temporary confinement of the filtered blood is to maintain substantially equal hydraulic pressures a both sides of the screen at any given level so that clots and other particles will not tend to be forced by pressure within the screen against the inner side thereof and clog the screen openings. Thus it is seen that the whirling action of the vortex and the temporary confinement of filtered blood by the baffle tank collectively deter clogging of the screen.

Once the filtering commences it is of utmost importance to control the flow of blood from the supply tank into the filter unit so that it does not exceed the flow capacity of the blood through the screen. If this is not done the hydraulic pressure within the screen may so build up relative to that outside of the screen as to force clots and other particles into the screen openings, thereby clogging the screen.

The filtered blood gathering in the collection tank is not only free of hair and other foreign particles, but is in a state permitting it to be thereafter handled without any portion thereof coagulating and without fibrins being formed.

Our filtering apparatus and the method practiced thereby have been described with regard to the processing of blood, but it is not our intention by this example to infer that their use is limited to the filtering of blood.

The advantages of the invention, it is thought, will have been clearly understood from the foregoing detailed description. Minor changes will suggest themselves and may be resorted to without departing from the spirit of the invention, wherefore it is our intention that no limitations be implied and that the hereto annexed claims be given a scope fully commensurate with the broadest interpretation to which the employed language admits.

What we claim is:

1. In a method of processing blood after it has been drawn, storing the blood until it has completely coagulated, thoroughly mixing the clotted portion of the coagulated blood and the liquid portion thereof together and dissecting the blood clots, and passing the blood along with its dissected clots through a filter screen.

2. In a liquid filtering device, a baffle tank closed at the bottom and having an outlet spaced well above the latter, tubular filter means depending into said baffle tank and having multiple filter openings located in horizontal spaced relation to the baffle tank at levels below said outlet, an inlet into said filter means located above said outlet for introducing the liquid to be filtered, combination dicing and agitating means journal-mounted for rotary movement within said filter means, said combination means having blades operative to dice particles in said liquid which are larger than said filter openings and operative to form a common vortex of the unfiltered located between said filter means and the surrounding walls of said baffle tank below its said outlet, thereby preventing said particles from clogging the filter openliquid within said filter means and the filtered liquid ings and thereby delivering filtered liquid to said outlet.

3. A filtering device of claim 2 in which said baffle tank and filter openings have a common longitudinal vertical axis.

4. The filtering device of claim 3 in which the rotary axis of said combination dicing and agitating means coincides with said common longitudinal vertical axis.

5. The filtering device of claim 2 in which said filter openings have an area corresponding to that of a circle having a diameter of about 0.028 inches for filtering coagulated blood whose clots are diced by said blades.

6. The filtering device of claim 2 in which said baffle tank is mounted in a collection tank.

7. The filtering device of claim 6 in which said collection tank has a removable cover plate which carries said filter means and said combination dicing and agitating means.

8. The filtering device of claim 6 in which said filter means has an out-turned upper marginal lip and in which said collection tank has a removable cover plate clamped against said lip, said cover plate having an opening therethrough serving as said inlet and said cover plate carrying said combination dicing and agitating means.

9. The filtering device of claim 2 in which said baffle tank is mounted within a collection tank and has an open upper end which comprises said outlet.

10. The filtering device of claim 9 in which said collection tank has a removable cover plate which carries said filter means and said combination dicing and agitating means and which is spaced above said open upper end of the baffle tank.

11. In a blood filtering device, a collection tank, a baffle tank mounted within the collection tank, said baffle tank being closed at the bottom and having an outlet spaced well above the latter, a tubular screen depending into said baffle tank to a level below said outlet and having its screen openings with an area corresponding to that defined by a diameter of about 0.028 inches, an inlet into said screen located above said outlet for introducing coagulated blood to be filtered, dicing means within said screen means for dicing the blood clots into clot particles smaller than said screen openings, rotary means for forming a common vortex of the unfiltered blood within said screen and the filtered blood located between said screen and the surrounding walls of said baffle tank below its said outlet, thereby preventing said clots from clogging the screen openings and thereby delivering filtered blood to said outlet for overflow into said collection tank.

References Cited in the file of this patent

UNITED STATES PATENTS

| | | |
|---|---|---|
| 336,425 | Ockershausen | Feb. 16, 1886 |
| 994,377 | Cottrell | June 6, 1911 |
| 1,524,916 | Demme | Feb. 3, 1925 |
| 1,785,840 | Munroe | Dec. 23, 1930 |
| 1,973,990 | Marrinan | Sept. 18, 1934 |
| 2,186,987 | Nesset | Jan. 16, 1940 |
| 2,297,009 | Mead et al. | Sept. 29, 1942 |
| 2,408,741 | Dodge | Oct. 8, 1946 |
| 2,696,818 | Van Loghem | Dec. 14, 1954 |
| 2,758,597 | Elder | Aug. 14, 1956 |